(12) United States Patent
Calmer

(10) Patent No.: US 8,220,237 B1
(45) Date of Patent: *Jul. 17, 2012

(54) STALK ROLL

(76) Inventor: Marion Calmer, Alpha, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/985,150

(22) Filed: Jan. 5, 2011

Related U.S. Application Data

(63) Continuation of application No. 11/823,062, filed on Jun. 26, 2007, now Pat. No. 7,886,510, which is a continuation-in-part of application No. 10/623,322, filed on Jul. 19, 2003, now abandoned, which is a continuation-in-part of application No. 10/376,657, filed on Feb. 28, 2003, now Pat. No. 7,373,767.

(60) Provisional application No. 60/364,813, filed on Mar. 15, 2002.

(51) Int. Cl.
 *A01D 45/02* (2006.01)
(52) U.S. Cl. ............................................. 56/104; 56/103
(58) Field of Classification Search ................ 56/51–53, 56/103–105
 See application file for complete search history.

(56) References Cited

U.S. PATENT DOCUMENTS

| 1,827,216 | A | * | 10/1931 | Synck | 460/32 |
| 2,534,685 | A | * | 12/1950 | Shrader | 460/27 |
| 2,870,593 | A | * | 1/1959 | Anderson | 56/104 |
| 3,304,702 | A | * | 2/1967 | Russell | 56/104 |
| 3,707,833 | A | * | 1/1973 | Sutton | 56/104 |
| 3,858,384 | A | * | 1/1975 | Maiste et al. | 56/14.2 |
| 4,233,804 | A | * | 11/1980 | Fischer et al. | 56/104 |
| 6,050,071 | A | * | 4/2000 | Bich et al. | 56/52 |
| 6,216,428 | B1 | * | 4/2001 | Becker et al. | 56/104 |
| 7,237,373 | B2 | * | 7/2007 | Resing et al. | 56/104 |
| 7,373,767 | B2 | * | 5/2008 | Calmer | 56/95 |
| 7,788,890 | B2 | * | 9/2010 | Cressoni | 56/104 |
| 7,886,510 | B2 | * | 2/2011 | Calmer | 56/104 |

* cited by examiner

*Primary Examiner* — Alicia Torres
(74) *Attorney, Agent, or Firm* — Hamilton IP Law, PC; Jay R. Hamilton; Charles A. Damschen

(57) ABSTRACT

A stalk roll to be mounted upon a stalk roll drive shaft of a corn harvesting header is disclosed. In one embodiment, the stalk roll comprises a cylindrical shell, at least four flutes affixed to and extending radially from said cylindrical shell, wherein the flutes are arranged in a first group and a second group, wherein the first group and the second group contain an equal number of said flutes, and wherein a peripheral distance between the first group and the second group is greater than a peripheral distance between the flutes within either the first group or the second group.

17 Claims, 15 Drawing Sheets

STALK ROLL

CROSS REFERENCE TO RELATED APPLICATIONS

This non-provisional patent application claims priority from and is a continuation of U.S. patent application Ser. No. 11/823,062 filed on Jun. 26, 2007 now U.S. Pat. No. 7,886,510, which patent application was a continuation-in-part of U.S. patent application Ser. No. 10/623,322 filed on Jul. 19, 2003 now abandoned, which application was a continuation-in-part of U.S. patent application Ser. No. 10/376,657 filed on Feb. 28, 2003 now U.S. Pat. No. 7,373,767, which application claimed benefit of priority under 35 U.S.C. §119(e) of provisional U.S. Pat. App. No. 60/364,813 filed on Mar. 15, 2002. The preceding provisional and non-provisional patent applications are incorporated by reference herein in their entireties.

FIELD OF THE INVENTION

The apparatus described herein is generally applicable to the field of agricultural equipment. The embodiments shown and described herein are more particularly for improved harvesting of corn plants.

STATEMENT REGARDING FEDERALLY SPONSORED RESEARCH OR DEVELOPMENT

No federal funds were used to develop or create the disclosed invention.

REFERENCE TO SEQUENCE LISTING, A TABLE, OR A COMPUTER PROGRAM LISTING COMPACT DISK APPENDIX

Not Applicable

AUTHORIZATION PURSUANT TO 37 C.F.R. §1.171 (d)(c)

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyrights whatsoever.

BACKGROUND OF THE INVENTION

1. Field of the Invention

The invention is directed to a stalk roll having a revolving cornstalk engagement gap for a corn header.

2. Description of the Prior Art

In the past thirty years, four external factors have greatly impacted corn harvesting. First, environmentally friendly residue management rules mandate that the farmer keep a certain percentage of crop residue on the surface of the land to prevent soil erosion. Second, yields have doubled through improved genetics, fertilization, populations, and row spacing. Third, genetics have also improved plant health and stalk vigor. Fourth, harvesting machines are larger with increased horsepower, capacity, ground speed, and the machines utilize corn heads with more row units.

In combination, these factors require that during separation of a corn plant ear (or "ear") from a cornstalk (or "stalk"), modern stalk rolls: (1) increase the rate of ear separation; (2) ensure that the corn plant is not severed from its root system; (3) increase the speed at which cornstalks are ejected from the row unit; (4) retain minimal amounts of material other than ears ("MOTE") in the heterogeneous material being delivered to the combine for threshing; and, (5) lacerate and/or penetrate the shell of the stalk to expose the internal portions of the stalk for accelerated decomposition of the stalk.

As shown in FIG. 1, modern corn headers are provided with several row crop dividers (snouts) for retrieving, lifting, and directing the rows of cornstalks toward their respective corn plant engagement chambers. The corn plant engagement chamber is defined herein as the portion of the corn head row unit that engages the cornstalk and separates the ear from the corn plant. FIG. 1A shows the top view of two stalk rolls found in the prior art. Gathering chains located in the corn plant engagement chamber draw the stalks towards the header. Stalk rolls located beneath the gathering chains pull the stalks rapidly downward, returning the stalk to the field. These stalk rolls are powered by a gearbox. As the stalk rolls rotate, the flutes on the stalk rolls engage and pull the cornstalks downward. Two stripper plates located above the stalk rolls, with one stripper plate on either side of the corn row, are spaced wide enough to allow the cornstalks and leaves to pass between them but narrow enough to retain the ears. This causes the ears to be separated from the corn plant as the cornstalk is pulled down through the stripper plates. The stalk rolls continue to rotate and eject the unwanted portions of the corn plant below the corn plant engagement chamber, thereby returning the unwanted portions of the corn plant to the field.

The performance of stalk rolls found in the prior art, as shown in FIGS. 3-5, has been found to be less than optimal. Attempts at increasing stalk roll performance and increasing ear separation speed have been made by increasing rotational speed of the stalk rolls. This was unsuccessful because stalk rolls having uniform length flutes rotating at high speeds simulate a solid rotating cylinder, which restricts entry of the corn plant into the corn plant engagement chamber. The diameter of the simulated rotating cylinder is approximately equal to the distance from the tip of a first flute on a given stalk roll to the tip of a second flute oriented closest to 180 degrees from the first flute. This rotating cylinder effect prevents individual flutes from engaging the cornstalk and restricts corn plants from entering the corn plant engagement chamber. Thus, cornstalk engagement is hindered and the corn plant hesitates and does not enter the corn plant engagement chamber.

The prior art has attempted to increase the performance of cutting or chopping stalk rolls by adding more flutes to the stalk rolls. In effect, this reduces the performance of the stalk rolls because during rotation of the stalk rolls, a semi-continuous wall of steel that restricts entry of the cornstalk into the corn plant engagement chamber, as noted above. As more flutes are added to the stalk roll, rotation of the stalk roll causes the stalk roll to more closely simulate a rotating cylinder. When viewed along the axis of rotation of the stalk roll (the direction from which the stalk rolls would approach the cornstalk), adding more flutes restricts the ability of the cornstalks to enter the corn plant engagement chamber due to interference from the ends of the flutes. The result from higher rotational speeds of the stalk rolls explained above, or from an increased number of flutes is sometimes referred to as an eggbeater effect. When the gathering chain paddle passes above the stripper plates and engages a corn plant that is restricted from entering the corn plant engagement chamber, it will break or sever the cornstalk prior to ear separation. Cornstalk severance prior to ear separation increases intake of MOTE to the combine, thereby increasing horsepower and fuel requirements. This hesitation may also cause ear separation to take place near the opening of the row unit and allow loose ears to tumble to the ground, thereby becoming irretrievable. (See U.S. patent application Ser. No. 10/376,657 filed by applicant.)

FIG. 3 shows prior art opposing stalk roll designs utilizing six flutes that inter-mesh and overlap. When the flutes of this type of stalk roll engage the cornstalk, the flutes alternately apply opposing force. This knife edge relationship causes at least two problems. First, the corn plants are violently tossed from side to side causing premature separation of loosely attached ears, thereby permitting the ear to fall to the ground and become irretrievable. Second, the cornstalk is cut or snapped at a node causing long, unwanted portions of the cornstalk and leaves to stay attached to the ear and remain in the row unit. This eventually creates a pile of trash or fluff in front of the cross-auger and feeder house and increases the amount of MOTE the combine must process. This problem is compounded as the number of row units per corn head is increased.

FIG. 4 shows the prior art stalk roll design with intermeshing knife edges as described in U.S. Pat. No. 5,404,699. As shown, the stalk rolls have six outwardly extending integral flutes. Each flute has a knife edge that is provided with a leading surface and a trailing surface. A respective knife edge extends the length of each flute in the direction radially distal from the stalk roll. The leading surface of the knife edge has a ten degree forward (with respect to the rotation of the stalk roll) slope and the trailing surface has a thirty degree reverse slope (with respect to the rotation of the stalk roll), both of which slopes are defined with respect to a radial plane extending through the vertex of the knife edge and the central longitudinal axis of the stalk roll. Therefore, the leading surface is steeper than the trailing surface of each knife edge. The radially extending flutes of the stalk rolls located in the corn plant engagement chamber are interleaved with one another in an intermeshing-type arrangement. The stalk rolls may be mounted in a cantilevered arrangement; or alternatively, in an arrangement employing nose bearings. The stalk roll comprises a cylindrical shell formed by two semi-cylindrical pieces that are clamped about a drive shaft. Bolts extend between the two semi-cylindrical pieces to pull the pieces together, thereby clamping the stalk rolls to the drive shaft.

This design, upon restricted engagement of the stalk roll with the cornstalk, allows the knife edges to cut stalks before pulling the stalks through the stripper plates to separate the ear from the stalk, effectively leaving the upper portion of the corn plant free to float in the corn row unit as shown in FIG. 3. This requires the combine threshing components to process a substantial portion of the stalk; again increasing combine horsepower and fuel requirements.

U.S. Pat. Nos. 4,845,930 and 5,040,361 disclose stalk rolls having interleaved canted blades for chopping the cornstalks (not shown). U.S. Pat. No. 4,233,804 discloses a stalk roll having six flutes in which three of the flutes are radially aligned with the central longitudinal axis of the stalk roll (not shown). Other chopping stalk rolls are disclosed in U.S. Pat. Nos. 3,304,702 and 4,974,402 (not shown). Semi-cylindrical husking rolls have been clamped onto drive shafts by bolts as disclosed in U.S. Pat. Nos. 2,469,687, 2,538,965, and 3,101,720 (not shown).

FIG. 5 shows the design disclosed by U.S. Pat. No. 6,216,428, which is a stalk roll having bilaterally symmetric flutes with knife edges which are adjacent and overlap in the shear zone area. This design produces a shearing and cutting of the cornstalk using a scissor configuration produced by the leading and trailing edges of the opposing knife-edged flutes. Again, the cornstalks are cut off prior to ear separation. This is sometimes referred to as a scissor effect and also results in the need to process increased amounts of MOTE. As disclosed, the flutes of the stalk roll are detachable. The stalk roll of U.S. Pat. No. 6,216,428 is designed for use on Case New Holland corn heads that do not require nose bearings at the entrance (of corn plants) to the stalk rolls to operate properly and are mounted in a cantilevered arrangement.

Case IH corn heads built prior to development of U.S. Pat. No. 6,216,428 used stalk rolls having four knives that are bolted to a solid shaft. Adjacent stalk rolls are registered with one another so that as the stalk rolls are rotated, the knives of the opposing stalk rolls are also opposing rather than intermeshing. In an opposing arrangement, the knives come into contact with opposite sides of the cornstalk at the same general height of the cornstalk, thereby lacerating the cornstalk for accelerated decomposition. It is important that the blades are correctly registered with one another, and that the blades are correctly spaced from one another. The stalk rolls used on Case IH corn heads require nose bearings at the forward end (with respect to the direction of travel of the combine during threshing) of the stalk rolls to operate properly and may not be mounted in a cantilevered arrangement.

The stated objective of the prior art disclosed in FIGS. 4 and 5 is to promote faster decomposition of the crop residue, increased erosion control, and decreased plugging of tillage tools. However, a finely cut cornstalk that is severed from the ground may actually reduce the erosion protection provided by crop residue because it washes or blows from the field, leaving the soil particles susceptible to erosion due to rain or wind. This type of crop residue management system has now been determined to be environmentally unfriendly.

SUMMARY OF THE INVENTION

It is an object of the present invention to provide a stalk roll structure with an improved, unrestricted entry area for the cornstalks into the corn plant engagement chamber that effectively and efficiently separates ears of corn from cornstalks while mutilating the cornstalks during harvesting to accelerate decomposition.

The stalk rolls of the present invention are to be mounted to and around stalk roll drive shafts located on either side of the corn plant engagement chamber (i.e., the portion of the corn head row unit that engages the cornstalk and separates the ear from the cornstalk). The stalk roll drive shafts cause the stalk rolls to rotate in opposite directions to pull the cornstalks downwardly through the stalk rolls so that the ears of corn are snapped off by the stripper plates located above the stalk rolls. As described in detail below, a cornstalk slot between the two opposing stalk rolls is defined, and the orientation and arrangement of the respective flutes on each of two opposing stalk rolls cause the cornstalk slot to be void of any flutes (defined as a stalk engagement gap) at least once per revolution of the stalk rolls. The stalk engagement gap facilitates unrestricted entry of the cornstalk into the corn plant engagement chamber, decreases the amount of MOTE the combine processes, and helps to increase decomposition of the cornstalk.

The stalk rolls according to the present invention are fashioned with flutes that may or may not include a knife edge. The flutes may be integrally formed into the stalk roll or affixed thereto. The flutes of each stalk roll are organized in at least two groups, with each group having an equal number of flutes. The circumferential distance between two flutes in a respective group is generally less than the circumferential distance between any two flutes in adjacent groups. Stalk rolls with flutes arranged according to these specifications are oriented with respect to each other so that at least once during the rotation of the stalk rolls, no flutes of any stalk roll restrict the entrance of a corn plant into the corn plant engagement chamber. Because the stalk rolls rotate at the same speed, each revolution of the stalk rolls will result in a moment in time in which no flutes of any stalk roll impede the entrance of a corn plant into the corn plant engagement chamber.

The stalk roll may be manufactured as a one-piece stalk roll formed from ductile iron that is engaged with a stalk roll drive shaft. In another embodiment of the present invention, the stalk roll may comprise a cylindrical shell formed by two semi-cylindrical pieces that are clamped about a mounting base secured to a drive shaft. In this embodiment, bolts extend between the two semi-cylindrical pieces to pull the pieces together thereby clamping the stalk rolls to the mounting base which is mounted on the drive shaft. The stalk roll of the present invention may be manufactured in other ways, as is well known to those skilled in the art; and the flutes may be attached or integrated into the stalk roll or the cylindrical shell portion thereof in any manner known to those skilled in the art.

While the practical advantages and features of the present invention and method have been briefly described above, a greater understanding of the novel and unique features of the invention may be obtained by referring to the drawings and detailed description of the preferred embodiment which follow.

DETAILED DESCRIPTION—DRAWINGS

FIG. 1A is an exploded top view of a portion of one row unit of FIG. 1 of the prior art showing a portion of the corn plant engagement chamber.

Figure 9A:
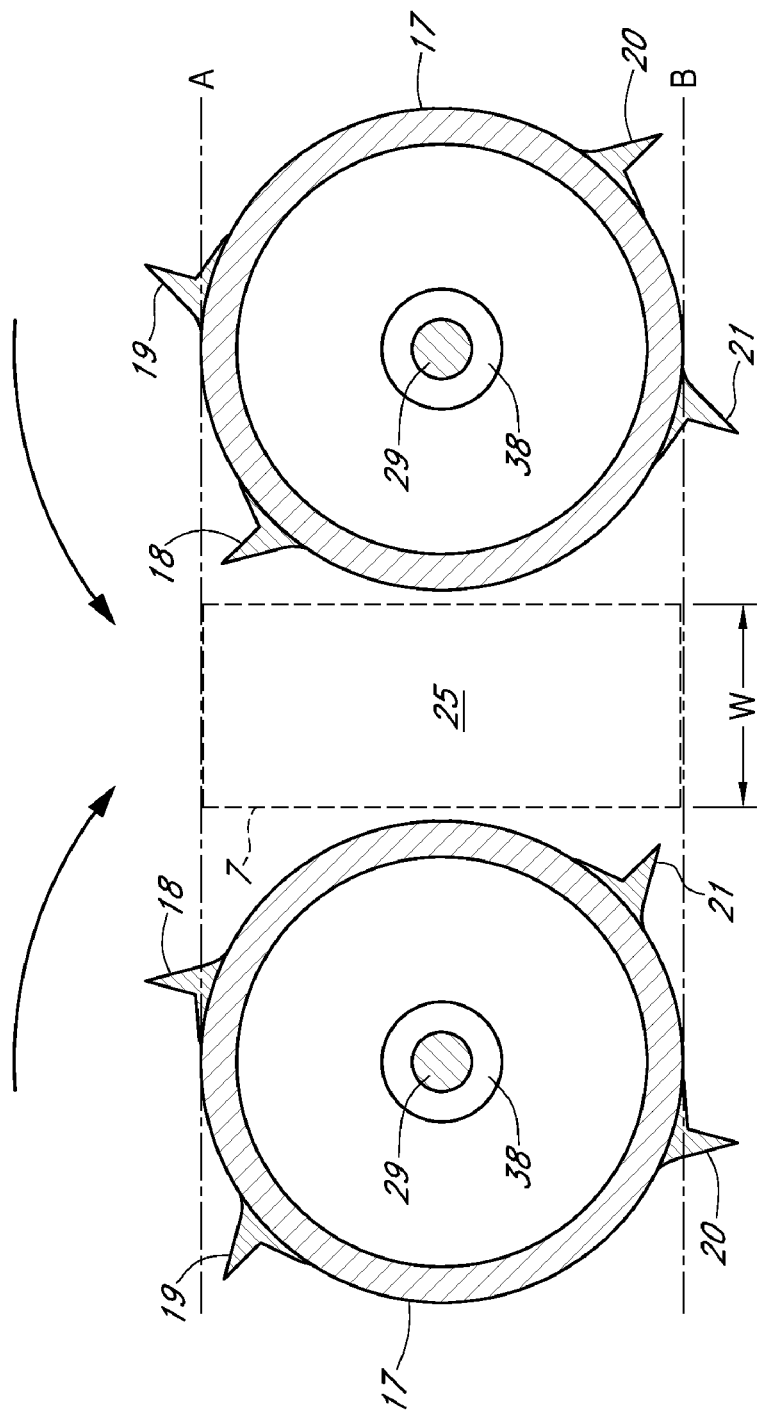
FIG. 9A is an end view of an opposing pair of the present art stalk rolls positioned to illustrate a first moment during which the stalk engagement gap is present.
Figure 9B:
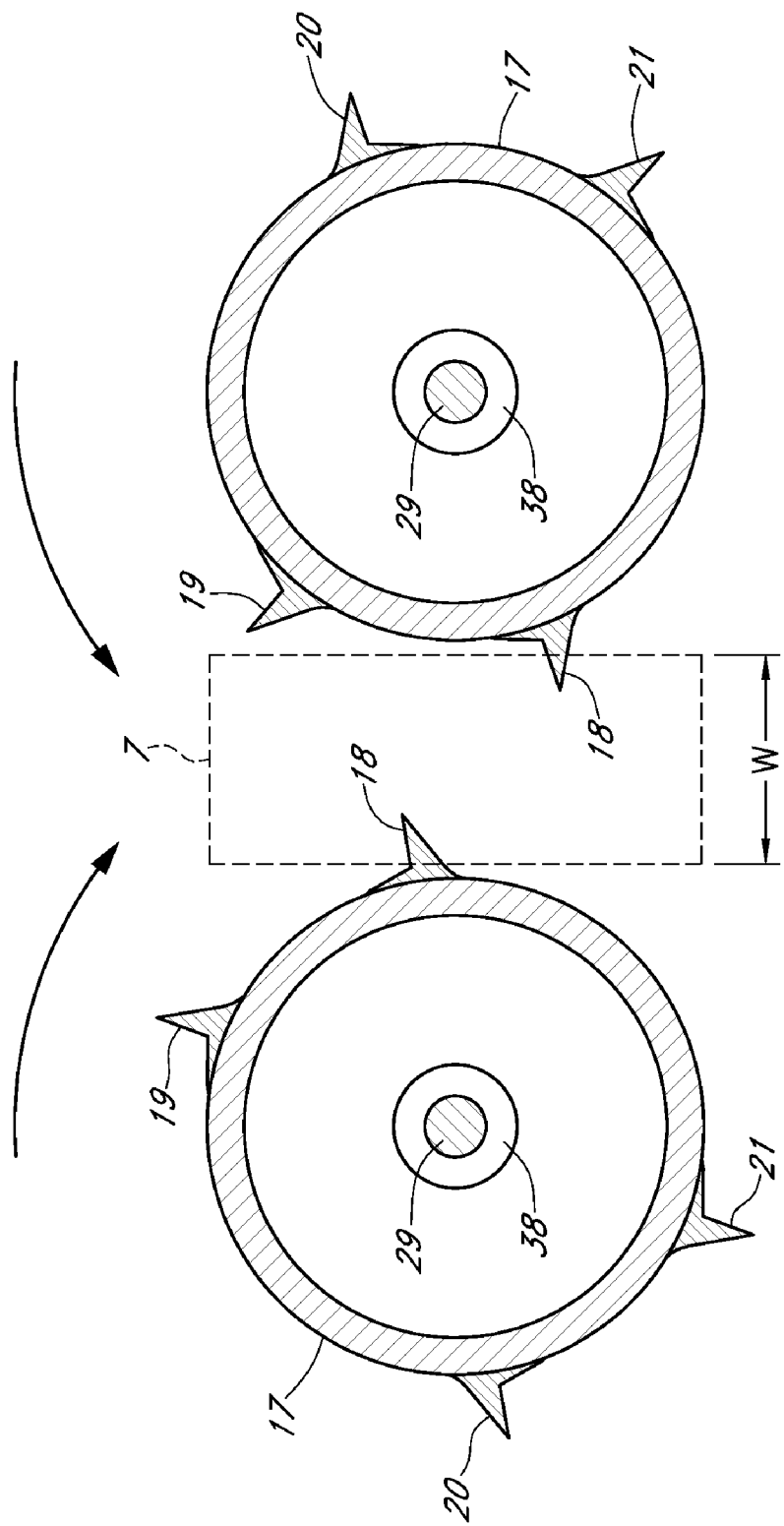
FIG. 9B is an end view of an opposing pair of the present art stalk rolls at a moment in time later than that depicted in FIG. 9A showing the stalk rolls rotated so that the stalk engagement gap is no longer present due to the first opposing flutes positioned in the cornstalk slot.
Figure 9C:
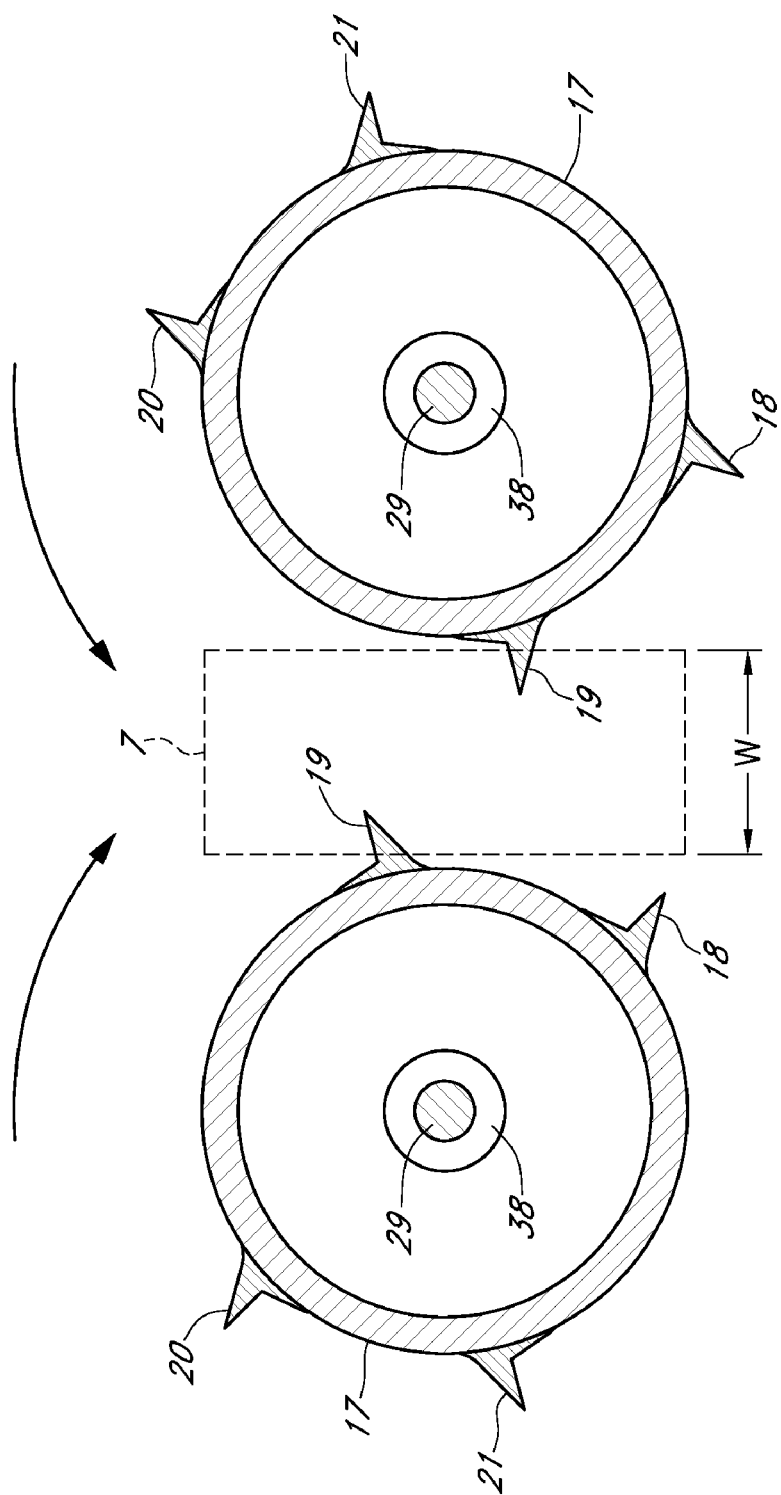

FIG. 9C provides an end view of an opposing pair of the present art stalk rolls at a moment in time later than that depicted in FIG. 9B showing the stalk rolls rotated so that the stalk engagement gap is not present due to the second opposing flutes positioned in the cornstalk slot.

Figure 9D:
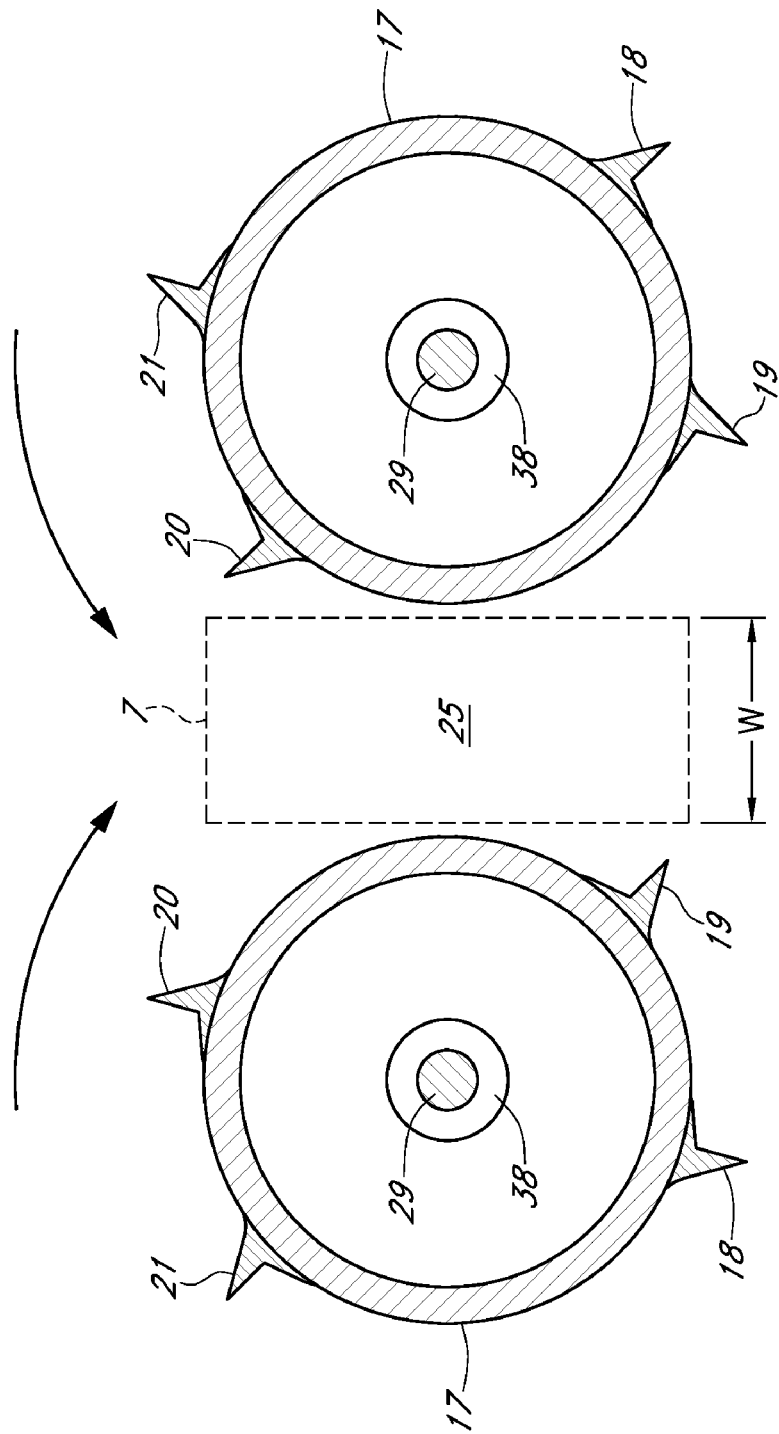

FIG. 9D is an end view of an opposing pair of the present art stalk rolls at a moment in time later than that depicted in FIG. 9C showing the stalk rolls rotated to a position where the stalk engagement gap is present for the second time during one revolution of the stalk rolls.

Figure 9E:
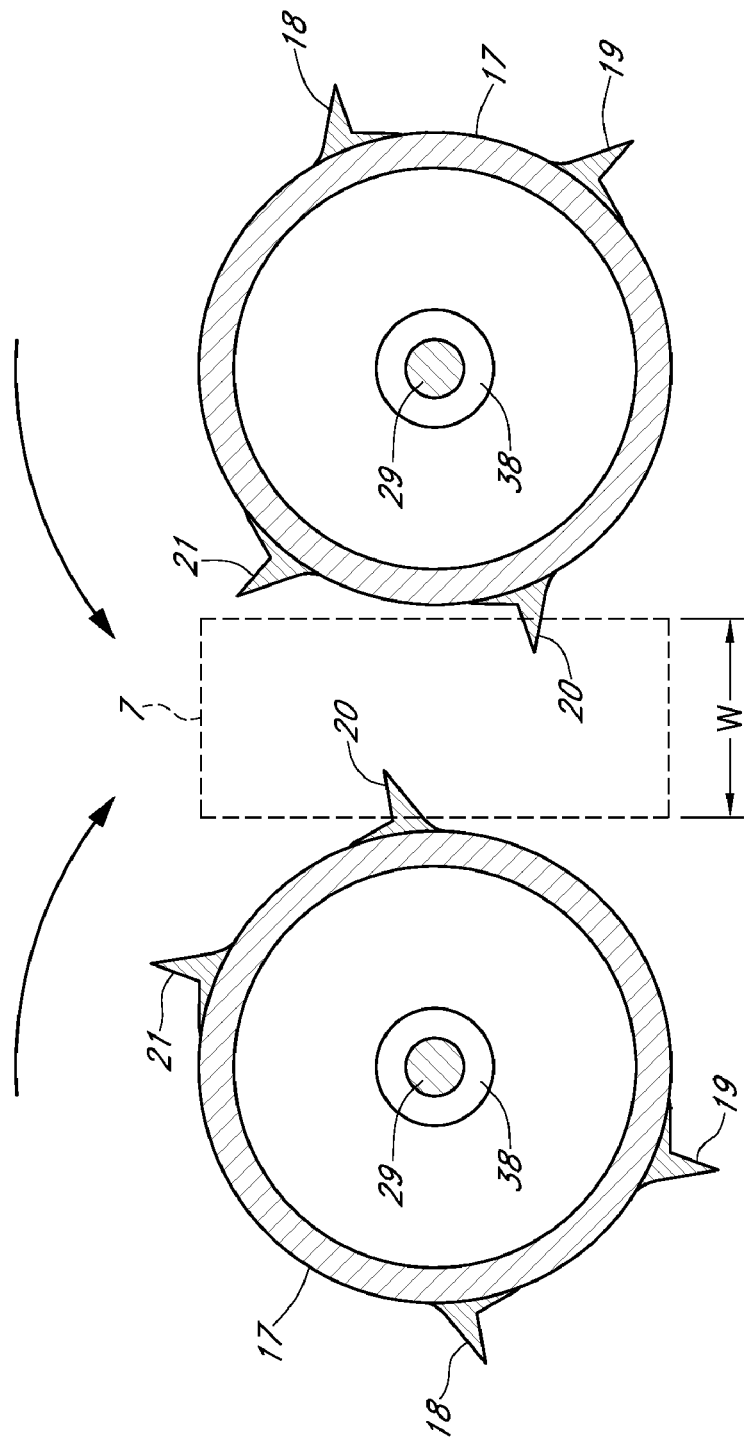

FIG. 9E is an end view of an opposing pair of the present art stalk rolls at a moment in time later than that depicted in FIG. 9D showing the stalk rolls rotated so that the stalk engagement gap is no longer present due to the third opposing flutes positioned in the cornstalk slot.

Figure 9F:
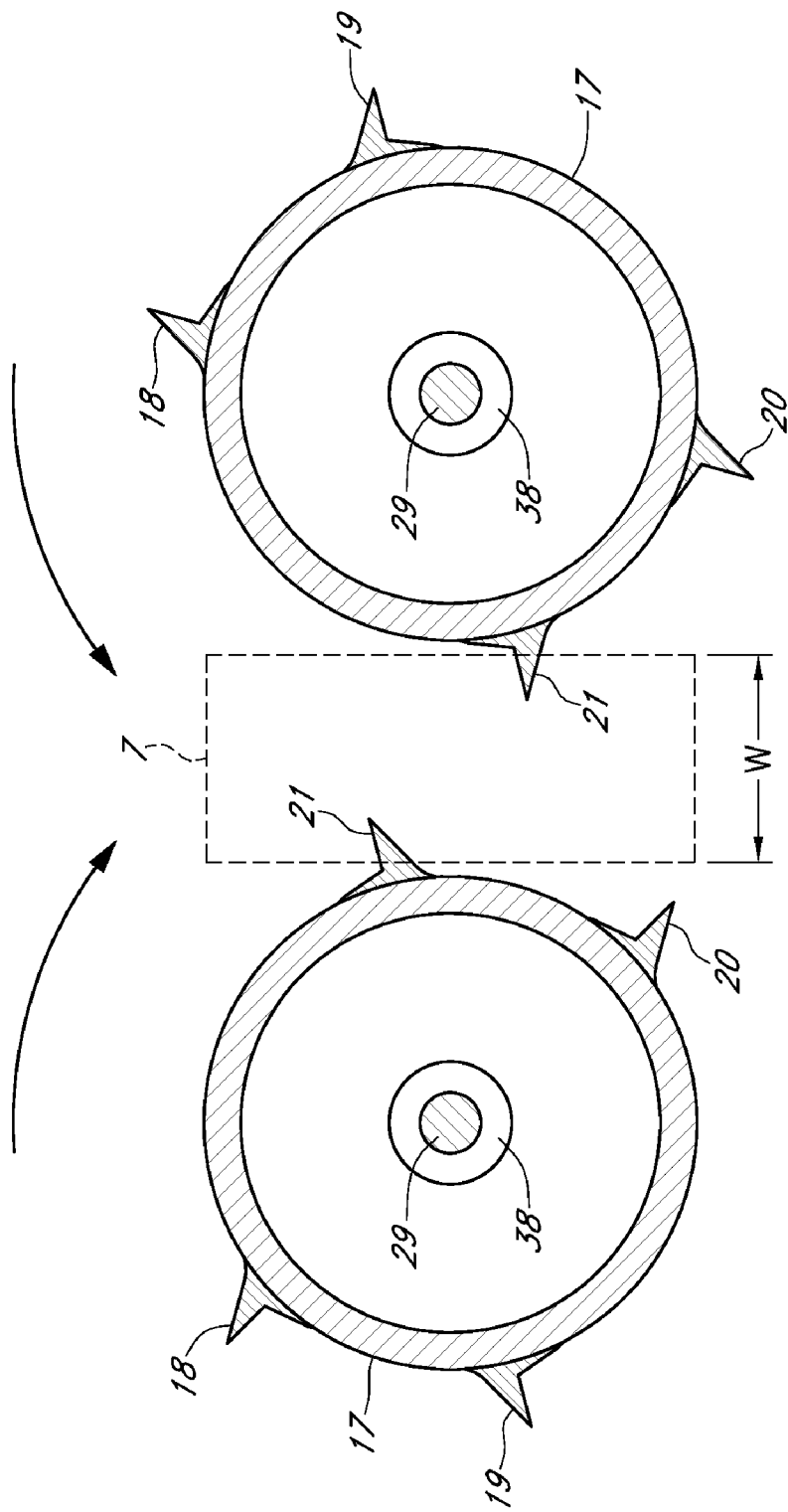

FIG. 9F is an end view of an opposing pair of the present art stalk rolls at a moment in time later than that depicted in FIG. 9E showing the stalk rolls rotated so that the stalk engagement gap is not present due to the fourth opposing flutes positioned in the cornstalk slot.

Figure 10:
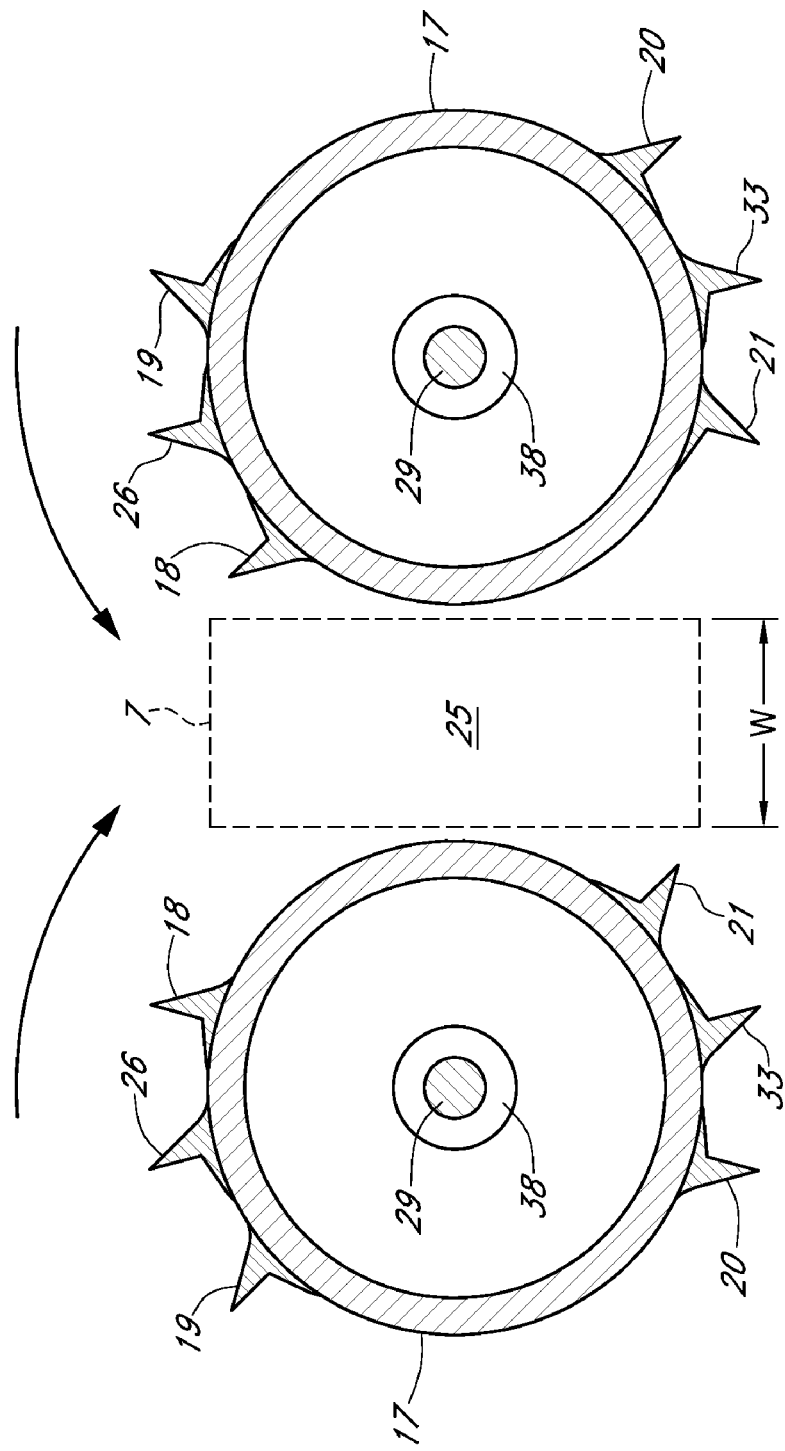

FIG. 10 is an end view of another embodiment of an opposing pair of the present art stalk rolls having fifth and sixth flutes with a rotational position corresponding to the position of the stalk rolls in FIG. 9A.

Figure 11:
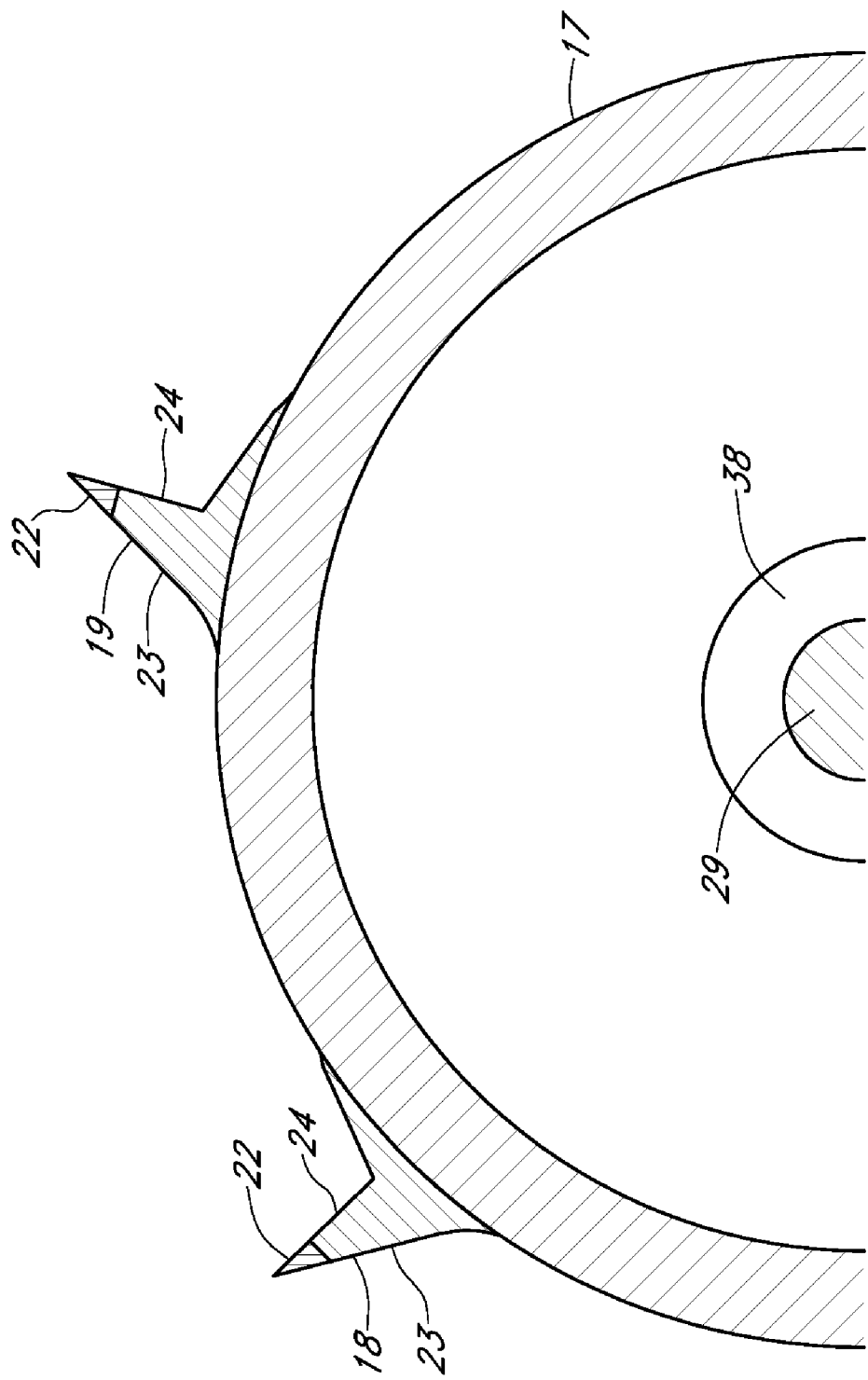

FIG. 11 is an end view of an opposing pair of the present art stalk rolls illustrating another embodiment having flutes with knife edges.

DETAILED DESCRIPTION - ELEMENT LISTING

| ELEMENT | ELEMENT # |
|---|---|
| Gathering Chain Paddle | 1 |
| Gathering Chain | 2 |
| Stripper Plate | 3 |
| Row Divider | 4 |
| Nose Cone | 5 |
| Transport Vane | 6 |
| Cornstalk Slot | 7 |
| Cross Auger Trough | 8 |
| Cross Auger | 9 |
| Cross Auger Flighting | 10 |
| Feeder House | 11 |
| Stalk Roll (Prior Art) | 12 |
| Corn Plant Ear | 13 |
| Outer Shell of Cornstalk | 14 |
| First (right) Stalk Roll | 15 |
| Second (left) Stalk Roll | 16 |
| Cylindrical Shell | 17 |
| First Flute | 18 |
| Second Flute | 19 |
| Third Flute | 20 |
| Fourth Flute | 21 |
| Knife Edge | 22 |
| Leading Surface | 23 |
| Trailing Surface | 24 |
| Stalk Engagement Gap | 25 |
| Fifth Flute | 26 |
| Semi-Cylindrical Shell (Upper) | 27 |
| Semi-Cylindrical Shell (Lower) | 28 |
| Stalk Roll Drive Shaft | 29 |
| Annular Ridge | 30 |
| Short Bolt Hole | 31 |
| Short Bolt | 32 |
| Sixth Flute | 33 |
| Bolt Receiver | 34 |
| Intentionally Blank | 35 |
| Long Bolts | 36 |
| Long Bolt Hole | 37 |
| Intermediate Drive Shaft | 38 |
| Drive Shaft Bolt | 39 |
| Small Pin | 40 |
| Large Pin | 41 |

DETAILED DESCRIPTION

The general operation of corn heads having stalk rolls mounted thereon of the type illustrated in FIGS. 6-9 is similar to the operation of corn heads using stalk rolls 12 of the prior art (as illustrated in FIGS. 1-5). Although the convention for agricultural machine orientation is to define relative terms (such as "left" and "right") from the perspective of the machine operator, throughout this application the terms "left" and "right" are defined from the perspective of a corn plant. The power source for this corn head row unit is provided from a stalk roll drive shaft 29 through a gearbox, as described in the prior art and is well known to those skilled in the art and not pictured herein. Each corn head row unit on a corn harvesting header is provided with a first and second stalk roll 15, 16 arranged parallel to one another to make an opposing pair. The first and second stalk rolls 15, 16 are provided with nose cones 5 having transport vanes 6. Immediately behind the nose cones 5 are cylindrical shells 17 having a first, second, third, and fourth flute 18, 19, 20 and 21, respectively, mounted along the length of the first and second stalk rolls 15, 16 (as can easily be seen in FIG. 6). Each flute 18, 19, 20, 21 may further be provided with a knife edge 22, as is shown in detail in the embodiment depicted in FIG. 11. The knife edges 22 are substantially parallel to the central longitudinal axis of the cylindrical shell 17. As shown in the embodiment in FIGS. 6-9, the stalk rolls 15, 16 may be mounted in the cantilevered manner for rotation by their respective stalk roll drive shafts (not shown), thereby eliminating the need for support brackets or bearings.

As with corn harvesting headers employing stalk rolls 12 of the prior art, the stalk rolls 15, 16 of the present invention pull the cornstalk in a downward motion, causing the corn plant ears 13 to contact the stripper plates 3 and separate from the cornstalk. The flutes 18, 19, 20, 21 affixed to the stalk rolls 15, 16 may also act to lacerate or crush the cornstalk, and also facilitate ejection of the cornstalk from the corn plant engagement chamber. Gathering chain paddles 1 affixed to gathering chains 2 transport the loose corn plant ears 13 to the cross auger trough 8. The cross auger 9 moves the corn plant ears 13 from the cross auger trough 8 to the feeder house 11, which moves the corn plant ears 13 into the remainder of the combine for further processing, all of which is well known to those skilled in the art.

Figure 8:
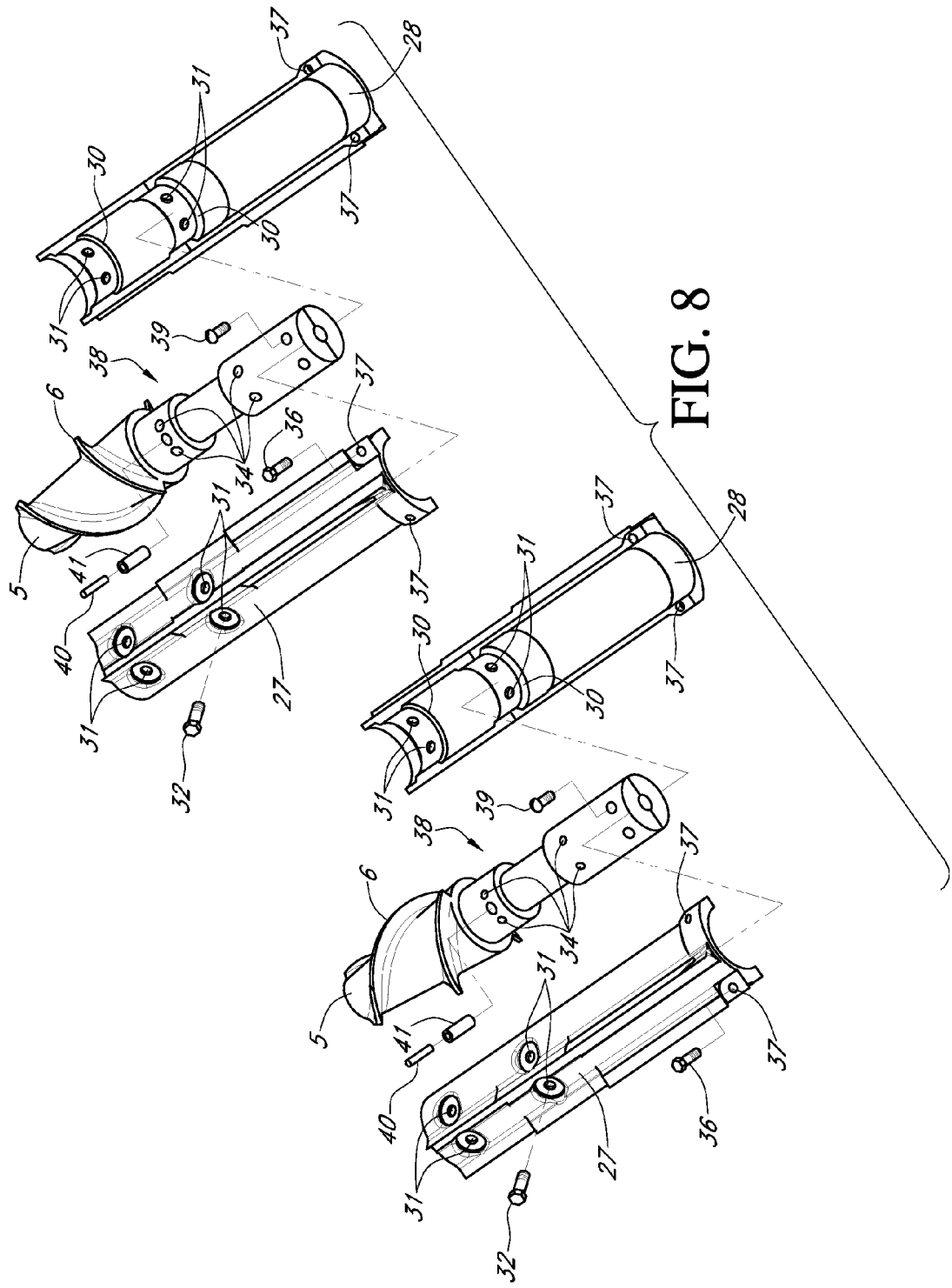
FIG. 8 is an exploded view of a pair of stalk rolls that are the subject of the present application.

In an embodiment not pictured herein, the stalk rolls 15, 16 may be manufactured as one-piece, formed from ductile iron that is adapted for engagement upon the stalk roll drive shaft 29. In another embodiment, the first and second stalk rolls 15, 16 may be built as two continuous, integral semi-cylindrical shells to be bolted to a stalk roll mounting base (not shown) into which the stalk roll drive shaft 29 is inserted, as is best illustrated in FIG. 8. The cylindrical shell 17 may be comprised of two semi-cylindrical shell pieces, an upper semi-cylindrical shell 27 and a lower semi-cylindrical shell 28, that are bolted to the intermediate drive shaft 38. The long bolt holes 37 and long bolts 36 with nuts or other securing means, along with the short bolt holes 31, short bolts 32, and bolt receivers 34, form a means for mounting the cylindrical shell 17 to the intermediate drive shaft 38, which is then mounted to the stalk roll drive shaft 29.

FIG. 8 best illustrates the mounting structure for an embodiment employing semi-cylindrical shells 27, 28. In one embodiment, each semi-cylindrical shell 27, 28 is fashioned with two inwardly extending annular ridges 30 having short bolt holes 31. Short bolts 32 pass through the short bolt holes 31 and engage bolt receivers 34 located on an intermediate drive shaft 38. Long bolts 36 pass through the long bolt holes 37 of two corresponding upper and lower semi-cylindrical shells 27, 28, and with a nut or other securing means clamp the semi-cylindrical shells 27, 28 together around the intermediate drive shaft 38. The intermediate drive shaft 38 is clamped to the stalk roll drive shaft 29 by drive shaft bolts 39. In addition, a small pin 40 and a large pin 41 prevent relative rotation between the intermediate drive shaft 38 and the stalk roll drive shaft (not shown in FIG. 8).

Each semi-cylindrical shell 27, 28 may be manufactured having at least two integral flutes. In one embodiment, the flutes are then machined to define the knife edge 22. Each knife edge 22 has a leading surface 23 and a trailing surface 24 that form an acute angle between them of approximately forty degrees, as shown in the embodiment pictured in FIG. 11. The leading surface is a rearward (with respect to the direction of rotation of one of the stalk rolls 15, 16 of an opposing pair) sloping surface, sloping approximately ten degrees from the radial plane defined by the central longitudinal axis of the cylindrical shell 17 and the vertex of the knife edge 22. The trailing surface 24 is a forward (with respect to the direction of rotation of one of the stalk rolls 15, 16 of an opposing pair) sloping surface, sloping approximately thirty degrees from the radial plane defined by the central longitudinal axis of the cylindrical shell 17 and the vertex of the knife edge 22. Other slopes and angles of the leading surface 23 and the trailing surface 24 may be used without departing from the spirit or scope of the present invention. As is well known to those skilled in the art, tungsten carbide may be applied to the trailing surfaces 24 to make the knife edges 22 self-sharpening. Although not shown, the layer of tungsten carbide is generally between three and twenty thousandths of an inch thick and is induction hardened. As illustrated in FIGS. 6-9, the flutes 18, 19, 20, 21 of the opposing first and second stalk rolls 15, 16 are offset to one another but not interleaved. As those of ordinary skill in the art will appreciate, the stalk roll design disclosed herein may also be implemented with a rounded flute edge or edge that does not have knife-like characteristics even though these embodiments are not pictured herein. Accordingly, the scope of the present invention is not limited by type of edge fashioned on the flute or the specific cross-sectional shape of the flute.

The present art alleviates the impediment to flow of cornstalks into the corn plant engagement chamber (which impediment is a result of the egg-beater effect, as described above) by creating at least one stalk engagement gap 25 in the cornstalk slot 7 per revolution of the stalk roll 15, 16, which is explained in detail below. When the stalk engagement gap 25 is present, corn plant entry into the corn plant engagement chamber is not restricted.

As may be seen in FIGS. 9A-9F, the width of the cornstalk slot 7 is defined as the distance between the inner periphery of the cylindrical shells 17 of the opposing stalk rolls 15, 16, which width is denoted "W" in FIGS. 9A-10. The height of the cornstalk slot 7 is essentially infinite, though in practicality the ground surface provides a lower limit for the cornstalk slot 7. The stalk engagement gap 25, as shown in FIGS. 9A, 9D, and 10, is then defined as the moment(s) during revolution of the first and second stalk rolls 15, 16 in which none of the flutes 18, 19, 20, 21 of the first or second stalk roll 15, 16 are positioned within the cornstalk slot 7. FIGS. 9B, 9C, 9E, and 9F illustrate the cornstalk slot 7 after the stalk engagement gap 25 is closed.

FIGS. 9A-9F provide six views of the cornstalk slot 7 at six different moments during one revolution of the stalk rolls 15, 16, with the direction of rotation of the stalk rolls 15, 16 indicated by the respective arrows. As will be explained in detail below, the embodiment shown in FIGS. 9A-9F is configured so that the stalk engagement gap 25 is present at two different moments in time during one revolution of the stalk rolls 15, 16; and as will be apparent to those skilled in the art, this is but one of many embodiments the present invention may take. Throughout one revolution of the stalk rolls 15, 16, at any point in time, the flutes 18, 19, 20, 21 may be engaged in five different modes of action upon a cornstalk at any point along the axial length of the flute 18, 19, 20, 21 (depending on the location and orientation of the flutes 18, 19, 20, 21 and the particular embodiment). The five modes of action upon the cornstalk are: (1) unrestricted entry of the cornstalk into the corn plant engagement chamber (which occurs at the moment in time shown in FIGS. 9A and 9D, although restricted entry may occur at other moments in time); (2) flute 18, 19, 20, 21 or knife engagement with the cornstalk (which may occur at moments in time shown in FIGS. 9B, 9C, 9E, and 9F, but may also occur at other moments in time); (3) lacerating and crushing of the cornstalk by the flutes 18, 19, 20, 21 or knives (which may occur at the moments in time shown in FIGS. 9B, 9C, 9E, and 9F, but may also occur at other moments in time); (4) ear separation and cornstalk ejection (which may occur at moments in time shown in FIGS. 9B, 9C, 9E, and 9F, but may also occur at other moments in time); (5) cornstalk release by the stalk rolls 15, 16 for lateral travel of the cornstalk (which most often occurs at moments in time shown in FIGS. 9A and 9D, but may also occur at other moments in time).

FIG. 9A shows the stalk engagement gap 25, and illustrates that when the stalk engagement gap 25 appears, no flutes 18, 19, 20, 21 are located in the cornstalk slot 7. When the stalk rolls 15, 16 are in this position a cornstalk (not shown) may freely enter the cornstalk slot 7 and the corn plant engagement chamber with no restriction. The engagement gap also allows cornstalks already positioned between the stalk rolls 15, 16 to travel in a lateral direction to compensate for the forward motion of the harvesting machine to which the corn head is attached.

FIG. 9B shows the cornstalk slot 7 at a later moment in time after the stalk rolls 15, 16 have rotated from their positions shown in FIG. 9A. FIG. 9B shows that at this point, the first flute 18 of each stalk roll 15, 16 has moved into the cornstalk slot 7 so that there is no engagement gap 25, and the first flutes 18 of the respective stalk rolls 15, 16 now engage any cornstalk between the stalk rolls 15, 16. This engagement may serve to lacerate or crush the cornstalk, or to pull the cornstalk downward through the corn plant engagement chamber and subsequently eject the cornstalk depending on the specific embodiment.

FIG. 9C shows the cornstalk slot 7 at still a later moment in time wherein the second flute 19 of each stalk roll 15, 16 has moved into the cornstalk slot 7 so that there is still no engagement gap 25. The second flutes 19 of each respective stalk roll 15, 16 now engage any cornstalk between the stalk rolls 15, 16. This engagement may serve to lacerate or crush the cornstalk, or to pull the cornstalk downward through the corn plant engagement chamber and subsequently eject the cornstalk depending on the specific embodiment.

FIG. 9D provides a snapshot of the cornstalk slot 7 at a moment in time later than the moment depicted in FIG. 9C, and shows the stalk engagement gap 25 present for the second time during this revolution of the stalk rolls 15, 16. The stalk engagement gap is present since no flutes 18, 19, 20, 21 are positioned within the cornstalk slot 7 when the stalk rolls 15, 16 are positioned as in FIG. 9D, and a cornstalk (not shown) may again freely enter the cornstalk slot 7 and the corn plant engagement chamber with no restriction. Again, the engagement gap also allows cornstalks already positioned between the stalk rolls 15, 16 to travel in a lateral direction to compensate for the forward motion of the harvesting machine to which the corn head is attached.

FIG. 9E shows the cornstalk slot 7 at a later moment in time from the moment shown in FIG. 9D wherein the third flute 20 of each stalk roll 15, 16 has moved into the cornstalk slot 7 so that there is no stalk engagement gap 25. At this point, the third flutes 20 of the respective stalk rolls 15, 16 now engage any cornstalk between the stalk rolls 15, 16. As with similar moments in time already explained, this engagement may serve to lacerate or crush the cornstalk, or to pull the cornstalk downward through the corn plant engagement chamber and subsequently eject the cornstalk depending on the specific embodiment.

FIG. 9F shows the cornstalk slot 7 at still a later moment in time wherein the fourth flute 21 of each stalk roll 15, 16 have moved into the cornstalk slot 7 so that there is still no stalk engagement gap 25. Here, the fourth flutes 21 of the respective stalk rolls 15, 16 engage any cornstalk between the stalk rolls 15, 16. Again, this engagement may serve to lacerate or crush the cornstalk, or to pull the cornstalk downward through the corn plant engagement chamber and subsequently eject the cornstalk depending on the specific embodiment. As will be apparent to those skilled in the art, the next snapshot in time of the cornstalk slot 7 according to the pattern indicated by FIGS. 9A-9F will be identical to FIG. 9A, and would provide the last view of one full revolution of the stalk rolls 15, 16.

FIGS. 6-9 illustrate the exemplary embodiment wherein the stalk rolls 15, 16 and their respective flutes 18, 19, 20, 21 are configured so that two stalk engagement gaps 25 appear per revolution of the stalk rolls 15, 16. As those of ordinary skill in the art will appreciate, the stalk rolls 15, 16 and their respective flutes 18, 19, 20, 21 may be configured so that nearly any number of stalk engagement gaps 25 appear per revolution of the stalk rolls 15, 16. For example, although not shown in the figures herein, one of ordinary skill in the art could easily add a fifth flute to the stalk rolls 15, 16 between the fourth and first flutes 18, 21 on each stalk roll 15, 16; and thereby reduce the number of stalk engagement gaps 25 per revolution of the stalk rolls 15, 16 from one to two.

In the exemplary embodiment shown in FIGS. 6-9, two structural features are necessary to create two stalk engagement gaps 25 per revolution of the stalk rolls 15, 16. First, the flutes 18, 19, 20, 21 of each stalk roll 15, 16 must be positioned around the circumference of the stalk roll 15, 16 in a non-equidistant manner. That is, the circumferential distance between the first flute 18 and fourth flute 21 is greater than the circumferential distance between the third flute 20 and fourth flute 21 on each stalk roll 15, 16. Likewise, the circumferential distance between the second flute 19 and third flute 20 is greater than the circumferential distance between the first flute 18 and second flute 19 of each stalk roll 15, 16. Second, the first stalk roll 15 of an opposing pair is positioned on its respective stalk roll drive shaft 29 so that it is slightly advanced (with respect to rotational positions of the flutes 18, 19, 20, 21) compared to the second stalk roll 16 of the pair. During operation, the stalk rolls 15, 16 operate at the same rotational speed so that the difference in positioning is maintained throughout operation. Because the stalk rolls 12 of the prior art and the flutes thereon are not configured to yield any stalk engagement gaps, they essentially create a wall of rotating steel as previously described, which restricts the entry of the cornstalk into cornstalk slot 7 and the corn plant engagement chamber.

FIG. 10 provides an end view of another embodiment of the improved talk rolls. In this embodiment, a fifth flute 26 is added between the first flute 18 and second flute 19 so that the distance between the first flute 18 and the fifth flute 26 is equal to the distance between the second flute 19 and the fifth flute 26. A sixth flute 33 has also been added between the third flute 20 and the fourth flute 21 so that the distance between the third flute 20 and the sixth flute 33 is equal to the distance between the fourth flute 21 and the sixth flute 33. FIG. 10 depicts a moment when the stalk engagement gap 25 is present, thereby allowing cornstalks to enter the corn plant engagement chamber. In this embodiment, as in the embodiment shown in FIGS. 9A-9F, the stalk engagement gap 25 appears twice per revolution of the stalk rolls 15, 16.

Figure 1:
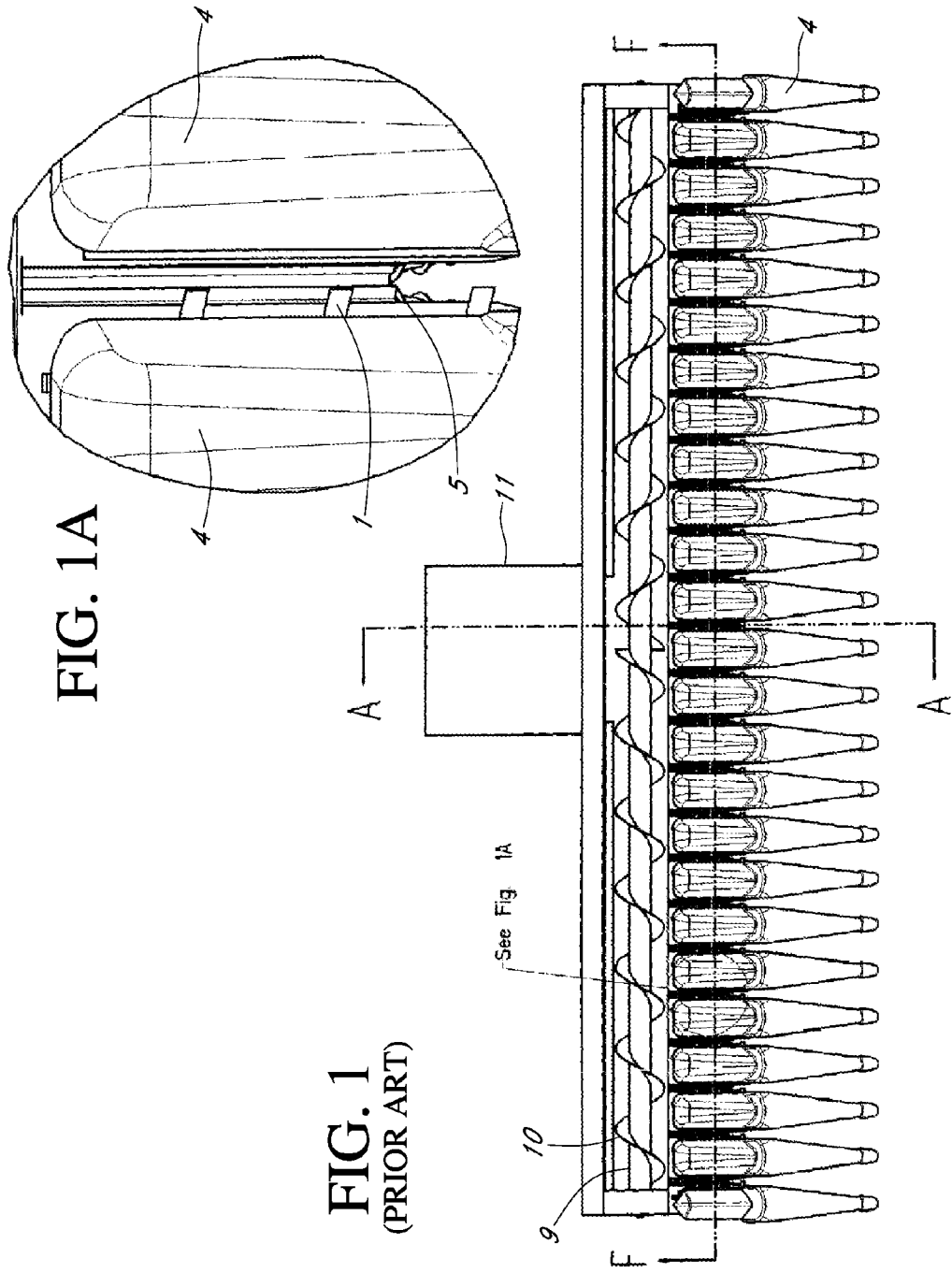
FIG. 1 is a top view of a corn head that contains a cross auger, a feeder house, a frame, and multiple row units of the prior art.
Figure 2:
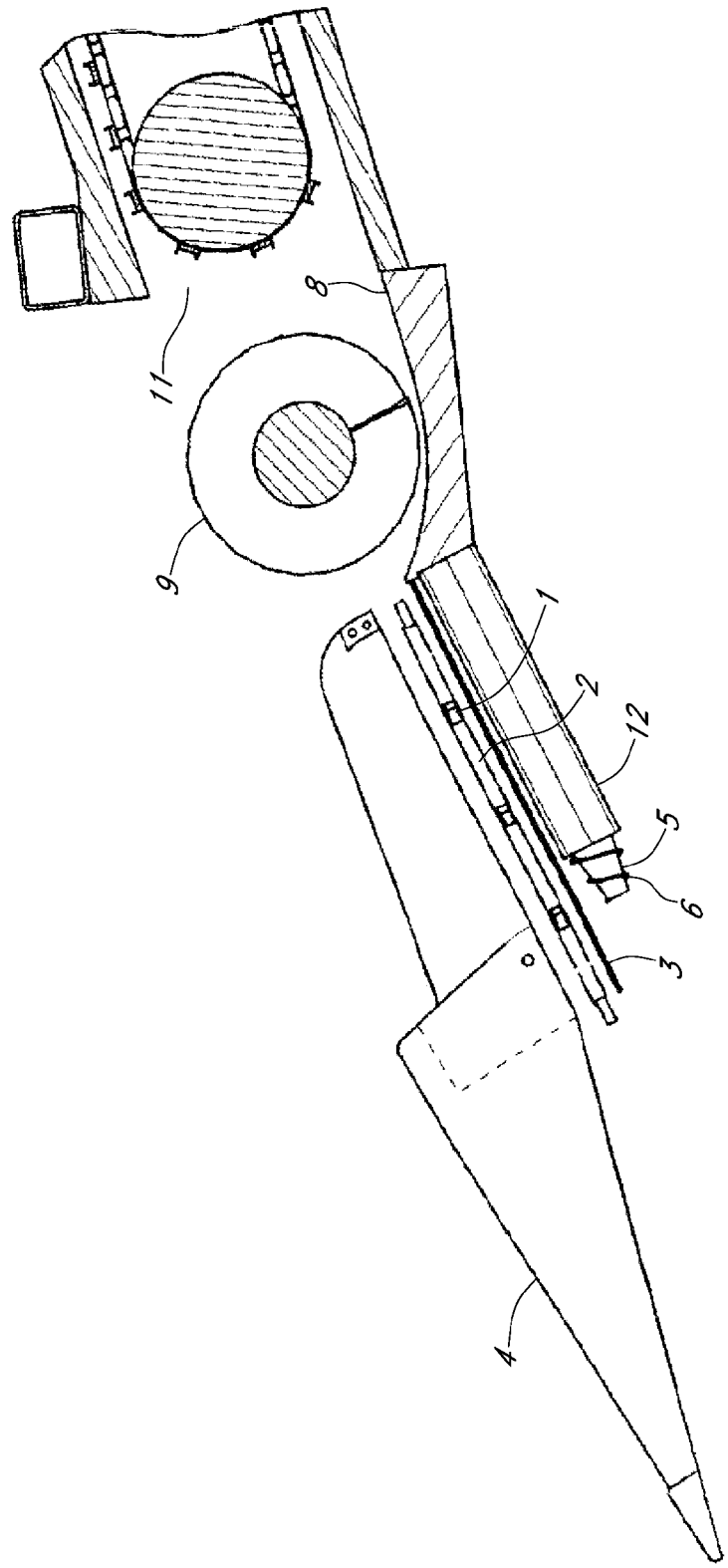
FIG. 2 is a cross-sectional view along the plane of A-A of one row unit, the cross auger, the cross auger trough, the feeder house, and the gathering chain from FIG. 1, as disclosed in the prior art.
Figure 3:
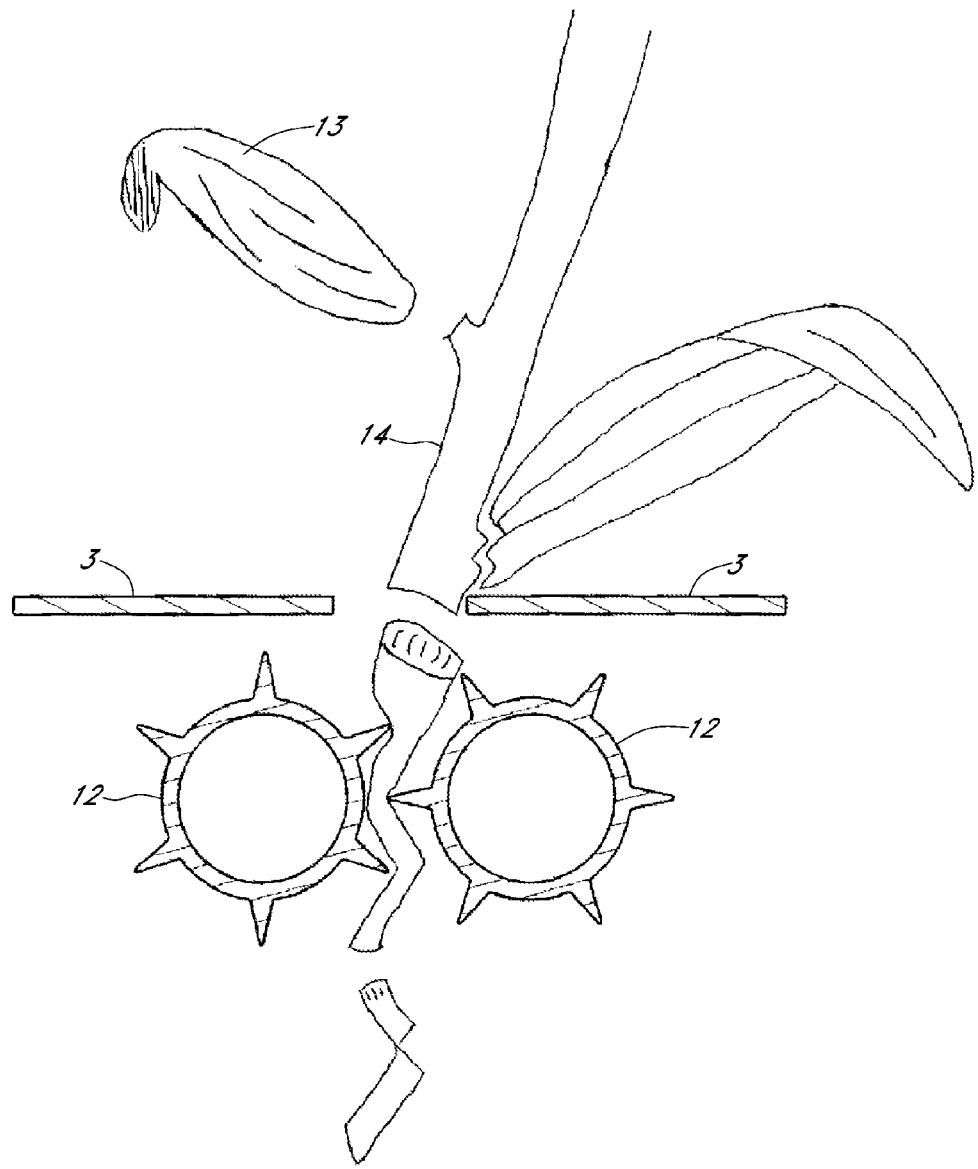
FIG. 3 is a cross-sectional view of a portion of the corn head shown in FIG. 1 along the plane F highlighting the stalk rolls and stripper plates of one row unit of the prior art engaged with and shearing a corn plant.
Figure 4:
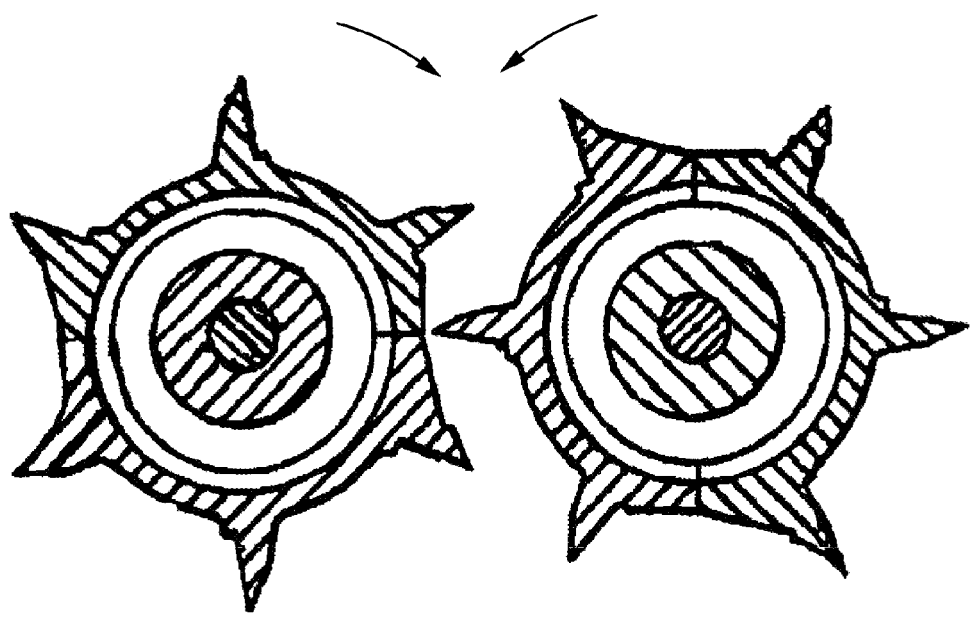
FIG. 4 is an end view of a pair of cutting type stalk rolls as disclosed in the prior art.
Figure 5:
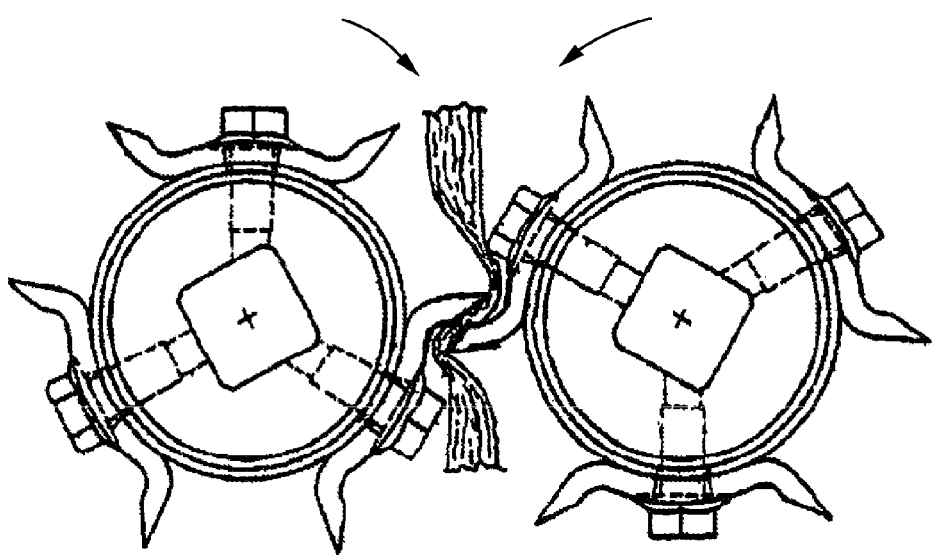
FIG. 5 is an end view of a pair of shearing-type stalk rolls as disclosed in the prior art.
Figure 6:
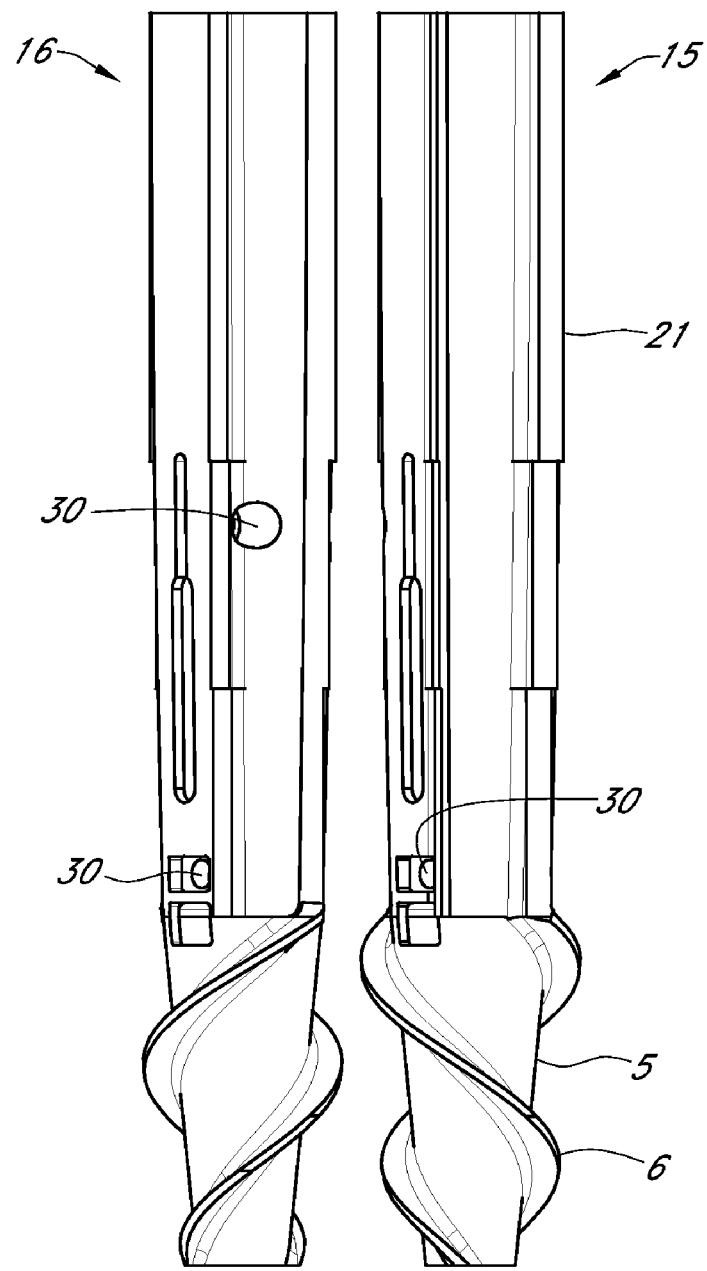
FIG. 6 is a top view of a pair of opposing stalk rolls that are the subject of the present application.
Figure 7:
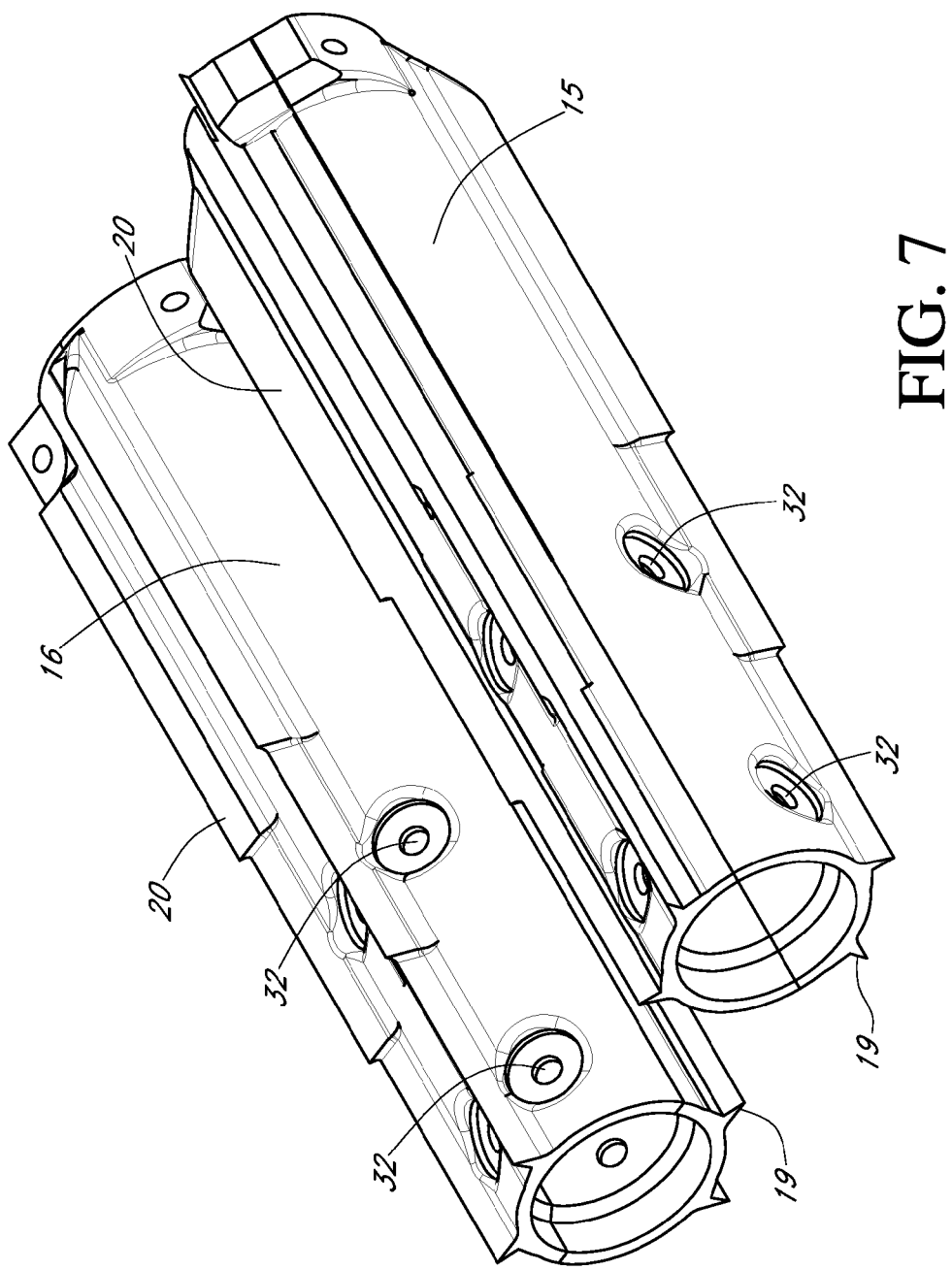
FIG. 7 is a perspective view of a pair opposing of stalk rolls that are the subject of the present application.

In an alternative embodiment not shown herein, additional flutes that have a smaller axial length as compared to the axial length of flutes 18, 19, 20, 21 could be placed between all or some of flutes 18, 19, 20, 21. (Alternatively some of the original flutes 18, 19, 20, 21 could be fashioned with a smaller axial length than the axial length of adjacent flutes 18, 19, 20, 31.) Here, the additional flutes would not extend the entire distance of the cylindrical shell 17. Instead, the additional flutes would only extend along the cylindrical shell 17 from a point proximal to the end of the cylindrical shell 17 closest to the cross auger 9 (which may be the same point from which the flutes 18, 19, 20, 21 extend, as shown in FIG. 6) to a point distal from the cross auger 9, but not the entire length of the cylindrical shell 7 up to the interface between the cylindrical shell 17 and the nose cone 5. That is, the additional flutes would not extend radially from the cylindrical shell 17 on a portion of the cylindrical shell 17 that is distal from the cross auger 9 (and also distal the connection between said stalk roll drive shaft 29 and the corn harvesting header). This embodiment facilitates stalk rolls 15, 16 that are configured so as to provide a stock engagement gap 25 along a predetermined axial portion of the stalk rolls 15, 16 that first engage the cornstalk (i.e., a portion distal from the cross auger 9) while still providing more flutes to engage the cornstalk in the corn plant engagement chamber on a portion of the stalk rolls 15, 16 proximal to the corn harvester header (which may assist in decomposition of the cornstalk and harvesting speed).

As is apparent from the embodiment shown in FIG. 10, the specific number and orientation of flutes 18, 19, 20, 21, 26, 33 employed on a stalk roll 15, 16 may vary. Therefore, the precise number of flutes 18, 19, 20, 21, 26, 33 employed in a particular embodiment, or the specific orientation thereof in no way limits the scope of the present invention. As long as the flutes 18, 19, 20, 21, 26, 33 are oriented upon the stalk rolls 15, 16 and the stalk rolls 15, 16 are orientated with respect to each other such that at least one stalk engagement gap 25 appears during one revolution of the stalk rolls 15, 16, the specific orientation or number of flutes 18, 19, 20, 21, 26, 33 are not limiting to the scope of the present invention. Furthermore, what is referred to herein as a cylindrical shell 17 of the stalk rolls 15, 16 need not be fashioned as a perfect cylinder; rather, it may be fashioned so that the cross-sectional area changes along the axial length, or be fashioned with any cross-sectional shape that performs in a relatively satisfactory manner.

Having described the exemplary embodiment as well as alternative embodiments, other features of the present invention will undoubtedly occur to those versed in the art, as will numerous modifications and alterations in the embodiments of the invention illustrated or disclosed herein, all of which may be achieved without departing from the spirit and scope of the invention.

The invention claimed is:

1. A pair of stalk rolls to be mounted upon a corn harvesting header comprising:
   a. a first stalk roll cooperatively engaged with a first stalk roll drive shaft for rotation in a first direction, said first stalk roll comprising:
      i. a cylindrical shell; and,
      ii. at least one group of flutes affixed to said cylindrical shell, said group of flutes extending radially from said shell along the axial length of said shell;
   b. a second stalk roll cooperatively engaged with a second stalk roll drive shaft for rotation in a second direction, wherein said second direction is opposite said first direction, said second stalk roll comprising:
      i. a cylindrical shell; and,
      ii. at least one group of flutes affixed to said cylindrical shell, said group of flutes extending radially from said cylindrical shell along the axial length of said cylindrical shell;
   c. a cornstalk slot having an infinite height and a width defined by the distance between two parallel vertical lines, wherein a first vertical line is tangent said cylindrical shell of said first stalk roll on the surface of said first stalk roll that faces said second stalk roll, wherein a second vertical line is tangent said cylindrical shell of said second stalk roll on the surface of said second stalk roll that faces said first stalk roll, and wherein a length of said cornstalk slot is less than the length of said cylindrical shell of either said first or said second stalk roll; and,
   d. a stalk engagement gap formed in said cornstalk slot during rotation of said first and second stalk rolls, wherein said stalk engagement gap is defined as a moment in time during which none of said flutes on said first stalk roll and none of said flutes on said second stalk roll are positioned within said cornstalk slot.

2. The pair of stalk rolls according to claim 1 wherein each of said flutes on said pair of stalk rolls have a knife edge formed by a leading surface and a trailing surface, wherein each said trailing surface extends radially from said cylindrical shell further than each said leading surface.

3. The pair of stalk rolls according to claim 2 wherein each said knife edge is self sharpening.

4. The pair of stalk rolls according to claim 2 wherein each said trailing surface is coated with tungsten carbide.

5. The pair of stalk rolls according to claim 1 wherein said flutes of said first stalk roll and said flutes of said second stalk roll are non-intermeshing during rotation.

6. The pair of stalk rolls according to claim 1 wherein said flutes of said first stalk roll and said flutes of said second stalk roll are intermeshing during rotation.

7. The pair of stalk rolls according to claim 1 wherein said flutes of said first stalk roll are not oriented in the same radial positions as said flutes of said second stalk roll.

8. The pair of stalk rolls according to claim 1 wherein said flutes of said first stalk roll are identical to said flutes of said second stalk roll.

9. The pair of stalk rolls according to claim 1 wherein the radial distance by which said flutes of said first stalk roll extend from said cylindrical shell of said first stalk roll and the radial distance by which said flutes of said second stalk roll extend from said cylindrical shell of said second stalk roll is less than half the width of said cornstalk slot.

10. A pair of stalk rolls to be mounted upon a corn harvesting header comprising:
   a. a first stalk roll cooperatively engaged with a first stalk roll drive shaft for rotation in a first direction, said first stalk roll comprising:
      i. a cylindrical shell;

ii. a first group of flutes affixed to said cylindrical shell, said first group of flutes extending radially from said cylindrical shell along the axial length thereof by a first distance; and,
  iii. a second group of flutes affixed to said cylindrical shell, said second group of flutes extending radially from said cylindrical shell along the axial length thereof by a second distance, wherein said first distance is greater than said second distance;
b. a second stalk roll cooperatively engaged with a second stalk roll drive shaft for rotation in a second direction, wherein said second direction is opposite said first direction, said second stalk roll comprising:
  i. a cylindrical shell;
  ii. a first group of flutes affixed to said cylindrical shell, said first group of flutes extending radially from said cylindrical shell along the axial length thereof by a first distance; and,
  iii. a second group of flutes affixed to said cylindrical shell, said second group of flutes extending radially from said cylindrical shell along the axial length thereof by a second distance, wherein said first distance is greater than said second distance;
c. a cornstalk slot having an infinite height and a width defined by the distance between two parallel vertical lines, wherein a first vertical line is tangent said cylindrical shell of said first stalk roll on the surface of said first stalk roll that faces said second stalk roll, wherein a second vertical line is tangent said cylindrical shell of said second stalk roll on the surface of said second stalk roll that faces said first stalk roll, and wherein a length of said cornstalk slot is defined by the difference in length between flutes in said first group and flutes in said second group on said first stalk roll; and,
d. a stalk engagement gap formed in said cornstalk slot during rotation of said first and second stalk rolls, wherein said stalk engagement gap is defined as a moment in time during which none of said flutes on said first stalk roll and none of said flutes on said second stalk roll are positioned within said cornstalk slot.

11. The pair of stalk rolls according to claim 10 wherein each of said flutes on said pair of stalk rolls have a knife edge formed by a leading surface and a trailing surface, wherein each said trailing surface extends radially from said cylindrical shell further than each said leading surface.

12. The pair of stalk rolls according to claim 11 wherein each said knife edge is self sharpening.

13. The pair of stalk rolls according to claim 11 wherein each said trailing surface is coated with tungsten carbide.

14. The pair of stalk rolls according to claim 10 wherein said flutes of said first stalk roll and said flutes of said second stalk roll are non-intermeshing during rotation.

15. The pair of stalk rolls according to claim 10 wherein said flutes of said first stalk roll and said flutes of said second stalk roll are intermeshing during rotation.

16. The pair of stalk rolls according to claim 10 wherein said flutes of said first stalk roll are not oriented in the same radial positions as said flutes of said second stalk roll.

17. The pair of stalk rolls according to claim 10 wherein said flutes of said first stalk roll are identical to said flutes of said second stalk roll.

\* \* \* \* \*